United States Patent Office 2,842,558
Patented July 8, 1958

2,842,558

α-MERCAPTO-γ-BUTYROLACTONES AND THEIR PREPARATION

Arthur F. Wagner, Princeton, N. J., assignor to Merck & Co., Inc., Rahway, N. J., a corporation of New Jersey No Drawing. Original application December 30, 1954, Serial No. 478,920, which is a division of application Serial No. 369,535, July 21, 1953. Divided and this application April 25, 1956, Serial No. 580,462

9 Claims. (Cl. 260—343.6)

This invention relates to 5-[3-(1,2-dithiacyclopentyl)] pentanoic acid. More particularly, it is concerned with the preparation of novel α,γ-[hydrocarbon substituted mercapto] butyric acids which are useful as intermediates in the synthesis of 5-[3-(1,2-dithiacyclopentyl)] pentanoic acid, and processes for preparing the same.

This application is a division of copending application Serial No. 478,920, filed December 30, 1954, which latter application is in turn a division of copending application Serial No. 369,535, filed July 21, 1953.

5-[3-(1,2-dithiacyclopentyl)] pentanoic acid is a growth stimulating crystalline substance first isolated from liver and originally called α-lipoic acid. This substance was found to have the structure

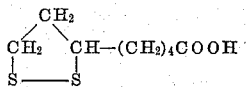

and was given the common name: 6-thioctic acid, as is disclosed in the J. Am. Chem. Soc., 74, 3455 (1952). Although 5-[3-(1,2-dithiacyclopentyl)] pentanoic acid can be isolated from natural materials such as liver, the difficulties encountered and low yields obtained have indicated the need for a practical synthetic method of producing the desired product.

Therefore, an object of this invention is to provide novel compounds useful for the synthetic production of 5-[3-(1,2-dithiacyclopentyl)] pentanoic acid. A further object is to provide processes for preparing these novel compounds.

According to one embodiment of the present invention novel α,γ-bis[hydrocarbon substituted mercapto] butyric acids are provided having the formula:

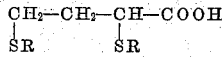

wherein R is a hydrocarbon radical such as an alkyl, alkenyl, aryl or aralkyl group together with processes and intermediates useful for preparing the same. These compounds are useful in the synthesis of 5-[3-(1,2-dithiacyclopentyl)] pentanoic acid.

The novel α,γ-bis[hydrocarbon substituted mercapto] butyric acids are produced by reacting an α,γ-dihalobutyric acid with an ammonium, alkali metal or alkaline earth metal hydrocarbon mercaptide to form the corresponding ammonium, alkali metal or alkaline earth metal salt of the α,γ-bis[hydrocarbon substituted mercapto] butyric acid and subsequently hydrolyzing the salt to the corresponding α,γ-bis[hydrocarbon substituted mercapto] butyric acid. This reaction may be conveniently illustrated as follows:

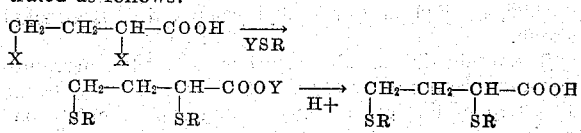

wherein X is a halogen, Y is ammonium, an alkali metal or alkaline earth metal, and R is a hydrocarbon radical such as an alkyl, alkenyl, aryl or aralkyl group.

The ammonium, alkali metal and alkaline earth metal salts of α,γ-bis[hydrocarbon substituted mercapto] butyric acids are conveniently produced by reacting the theoretical amount of about three molar equivalents of the corresponding ammonium, alkali metal or alkaline earth metal hydrocarbon mercaptide with one molar equivalent of an α,γ-dihalobutyric acid. Although this ratio of reactants has been found most satisfactory, other ratios including an excess of either reactant may also be employed if desired.

The reaction may be conveniently achieved by contacting the mercaptide and α,γ-dihalobutyric acid either in the presence or absence of an added solvent. In this regard, high yields of the desired product may be obtained by either of these methods. However, when the use of a solvent is desired inert organic solvents such as chloroform, carbon tetrachloride, toluene and lower alcohols may be employed with satisfactory results. In addition, water may be present in small amounts without adverse effect. Temperatures from about 0° C. to about 70° C. are suitable for effecting the reaction. However, the lower reaction temperatures are ordinarily preferred for effecting the reaction in the presence of a solvent while higher temperatures are employed when the reaction is carried out in the absence of a solvent.

The reaction is completed in a relatively short time, an hour being generally sufficient under ordinary circumstances. When the reaction has been completed the corresponding ammonium, alkali metal or alkaline earth metal salt of α,γ-bis[hydrocarbon substituted mercapto] butyric acid may be recovered by conventional methods or converted directly to the free acid according to the succeeding step. Examples of salts which may be prepared according to this process from the corresponding mercaptides are the ammonium, sodium, potassium, lithium, calcium and magnesium salts of α,γ-bis[methylmercapto] butyric acid, α,γ-bis[ethylmercapto] butyric acid, α,γ-bis[allylmercapto] butyric acid, α,γ-bis[phenylmercapto] butyric acid, α,γ-bis[benzylmercapto] butyric acid, and the like.

The ammonium, alkali metal and alkaline earth metal salts of α,γ-bis[hydrocarbon substituted mercapto] butyric acids are converted to the corresponding α,γ-bis[hydrocarbon substituted mercapto] butyric acids by acid hydrolysis. This reaction may be conveniently accomplished by acidifying the reaction mixture from the previous step with a suitable acid, preferably a mineral acid such as phosphoric acid, hydrobromic acid, hydrochloric acid and the like. The product may then be isolated from the reaction mixture by conventional means such as extraction or fractional distillation.

Illustrative of the overall process forming part of this invention is the production of α,γ-bis[methylmercapto] butyric acid by reacting α,γ-dibromobutyric acid with sodium methylmercaptide to produce sodium - α,γ - bis [methylmercapto] butyric acid which is hydrolyzed with hydrochloric acid to α,γ-bis[methylmercapto] butyric acid. Examples of other similar compounds which may be produced according to this process are α,γ-bis[ethylmercapto] butyric acid, α,γ-bis[propylmercapto] butyric acid, α,γ-bis[butylmercapto] butyric acid, α,γ-bis[amylmercapto] butyric acid, α,γ-bis[allylmercapto] butyric acid, α,γ-bis[3,5-dimethyl-2-heptenemercapto] butyric acid, α,γ-bis[2-methyl-1-ethyl-2-butenemercapto] butyric acid, α,γ-bis[3-methyl-2-ethyl-2-pentenemercapto] butyric acid, α,γ-bis[phenylmercapto] butyric acid and α,γ-bis[benzylmercapto] butyric acid, The α,γ-dihalobutyric acids which are used as starting materials in this invention may be readily prepared by halogenating γ-butyrolactone with a phosphorous trihalide as is disclosed in U. S. Patent No. 2,530,348. This reaction may be achieved either with or without the use of an added solvent. However, some solvents which may be used if desired are chloroform, carbon tetrachloride, benzene and hexane. The α,γ-dihalobutyric acid formed according to this reaction may be used in the process of this invention as present in the reaction mixture or after its isolation therefrom by conventional methods. With regard to the present invention best results are obtained when α,γ-dichlorobutyric acid or α,γ-dibromobutyric acid is used as the starting material.

Examples of ammonium, alkali metal and alkaline earth metal hydrocarbon mercaptides which may be used in this invention to produce the corresponding α,γ-bis[hydrocarbon substituted mercapto] butyric acids are sodium methylmercaptide, magnesium ethylmercaptide, potassium propylmercaptide, calcium butylmercaptide, sodium phenylmercaptide, potassium benzylmercaptide, ammonium methylmercaptide, potassium allylmercaptide, sodium 3,5-dimethyl-2-heptenemercaptide, sodium 2-methyl-1-ethyl-2-butenemercaptide, potassium 3-methyl-2-ethyl-2-pentenemercaptide, and the like. The sodium and potassium salts of the respective mercaptides are preferred for use in the described reaction.

Also included within the purview of this invention are the esters of α,γ-bis[hydrocarbon substituted mercapto] butyric acids. In this regard, alkyl, aryl and aralkyl esters may be produced by reacting an α,γ-bis[hydrocarbon substituted mercapto] butyric acid with a halogenating agent to form the corresponding acyl halide and subsequently reacting the acyl halide with an alkanol, aryl alcohol or aralkanol to obtain the desired ester. This halogenation may be conveniently accomplished by reacting the α,γ-bis[alkyl, alkenyl, aryl or aralkyl mercapto] butyric acid, or an alkali metal salt thereof, with a suitable halogenating agent. Examples of halogenating agents which may be used are thionyl chloride, oxalyl chloride, phthalyl chloride, phosphorous trichloride and the like. The reaction is readily achieved in a liquid medium formed by using either an excess of the halogenating agent, when liquid, or an added inert organic solvent. Temperatures of about 0-10° C. are ordinarily suitable for effecting the reaction although higher temperatures may also be used. After the reaction has been completed the α,γ-bis [hydrocarbon substituted mercapto] butyryl halide is recovered according to the conventional procedures. Representative of the acyl halides produced in this manner are α,γ-bis[methylmercapto] butyryl chloride, α,γ-bis[ethylmercapto] butyryl bromide, α,γ-bis[allylmercapto] butyryl chloride and the like.

The α,γ-bis[hydrocarbon substituted mercapto] butyryl halides produced as above may be conveniently esterified by reacting the acyl halide with an excess of an alcohol corresponding to the ester desired. Thus, by reacting α,γ-bis[methylmercapto] butyryl chloride with methanol the corresponding methyl ester is obtained. Examples of other esters which are prepared in a like manner are ethyl-α,γ-bis[methylmercapto] butyrate, propyl-α,γ-bis[ethylmercapto] butyrate, butyl-α,γ-bis[propylmercapto] butyrate, methyl-α,γ-bis[ethylmercapto] butyrate, benzyl-α,γ-bis[methylmercapto] butyrate, methyl-α,γ-bis[allylmercapto] butyrate, methyl-α,γ-bis[phenyl-mercapto] butyrate and ethyl-α,γ-bis[benzylmercapto] butyrate.

In addition, lower alkyl esters may also be produced by reacting an α,γ-bis[hydrocarbon substituted mercapto] butyric acid with a diazoalkane, such as diazomethane or diazoethane, in a suitable dry inert solvent such as ether, chloroform, benzene and the like. The resulting esters, like the acids, are water insoluble oils which may be purified by distillation under reduced pressure.

The α,γbis[hydrocarbon substituted mercapto] butyric acids provided by this invention are useful in the production of 5-[3-(1,2-dithiacyclopentyl)] pentanoic acid, also called α-lipoic acid. One such method for producing 5-[3-(1,2-dithiacyclopentyl)] pentanoic acid, which process however, is not part of the present invention, being the invention of Holly, Wagner, Walton and Hoffman, Serial No. 396,334 filed December 4, 1953, comprises reacting an α,γ-bis [hydrocarbon substituted mercapto] butyryl halide with a tert.-butyl ethyl malonic acid diester α-ethoxymagnesium derivative in an anhydrous solvent, adding water and acid to reaction mixture to convert the resulting Grignard complex to a tert.-butyl-4,6-bis[hydrocarbon substituted mercapto]-2-carbethoxy-3-oxocaproate, treating said compound with p-toluenesulfonic acid to produce an ethyl-4,6- bis [hydrocarbon substituted mercapto]-3-oxocaproate, reacting said compound with methyl β - chloropropionate to form a methyl-6,8-bis[hydrocarbon substituted mercapto] - 4 - carbethoxy-5 - oxocaprylate, deesterifying and decarboxylating said compound with a mixture of glacial acetic acid and hydrochloric acid to obtain 6,8-bis[hydrocarbon substituted mercapto]-5-oxocaprylic acid, reducing said compound with sodium borohydride to the corresponding 5-hydroxy caprylic acid which immediately forms a 6,8-bis[hydrocarbon substituted mercapto]-5- hydroxy caprylic acid 5-lactone, reacting said lactone in glacial acetic acid containing phosphorous and iodine to produce 6,8-bis[hydrocarbon substituted mercapto] caprylic acid and converting said compound to α-lipoic acid by dealkylation and reaction with iodine-potassium iodide. The α,γ-bis[hydrocarbon substituted mercapto] butyric acids which may be used according to this synthesis of α-lipoic acid are those in which the hydrocarbon substituent is an alkyl, alkenyl, aryl or aralkyl group such as the methyl, ethyl, allyl, benzyl and phenyl radicals.

According to a further embodiment of this invention compounds having the formula $$\begin{array}{c} CH_2-CH_2-CH-COOH \\ | \quad\quad\quad | \\ SR' \quad\quad SR \end{array}$$

wherein R is a hydrocarbon radical such as an alkyl, aryl or aralkyl group and R' is an alkyl group, may be produced according to an additional novel process. These compounds are also useful intermediates in the synthesis of 5-[3-(1,2-dithiacyclopentyl)] pentanoic acid, or α-lipoic acid.

Compounds having the described formula may be conveniently produced by reacting an α-halo-γ-butyrolactone with an ammonium, alkali metal or alkaline earth metal hydrocarbon mercaptide to produce an α-hydrocarbon substituted mercapto-γ-butyrolactone, reacting said compound with an ammonium, alkali metal or alkaline earth metal alkyl mercaptide to produce the corresponding ammonium, alkali metal or alkaline earth metal alkyl mercaptide addition product of the α-hydrocarbon substituted mercapto-γ-butyrolactone and heating said addition compound to produce the desired product. This process may be represented structurally as follows:

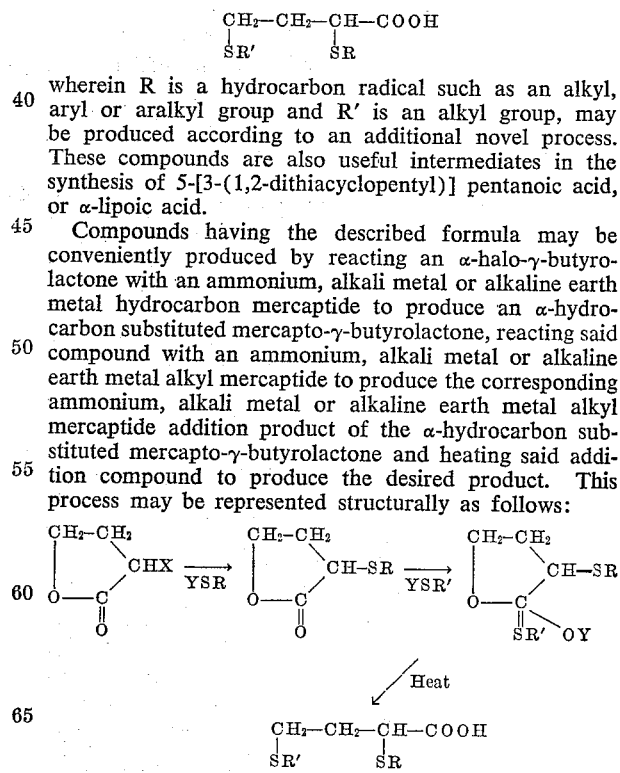

wherein X represents a halogen, Y is ammonium, an alkali metal or alkaline earth metal and R is a hydrocarbon such as an alkyl, aryl or aralkyl group and R' is an alkyl group.

The production of α-hydrocarbon substituted mercapto-γ-butyrolactones is readily accomplished according to the first step of this process by reacting approximately one equivalent of an α-halo-γ-butyrolactone with about one equivalent of an alkali metal or alkaline earth metal hydrocarbon mercaptide. This reaction may be conveniently achieved by contacting the reactants in a suitable inert organic solvent such as the lower alcohols, hexane, benzene, toluene and inert chlorinated solvents such as chloroform and carbon tetrachloride. The reaction is exothermic in nature and to prevent overheating the reactants are generally combined slowly and the mixture cooled by suitable means. In this connection, it is preferred to maintain a reaction temperature below 60° C. to prevent destruction of the reactants and the product. Usually an hour or so is sufficient to complete the reaction after which the product may be recovered from the reaction mixture by conventional methods. One such method comprises evaporating the solvent and purifying the product by extraction and fractional distillation.

α-Hydrocarbon substituted mercapto-γ-butyrolactones which are produced according to this process are α-alkyl, aryl and aralkyl mercapto-γ-butyrolactones such as α-methylmercapto-γ-butyrolactone, α-ethylmercapto-γ-butyrolactone, α-propylmercapto-γ-butyrolactone, α-phenylmercapto-γ-butyrolactone and α-benzylmercapto-γ-butyrolactone.

The α-halo-γ-butyrolactones used as starting materials in this process may be prepared by the application of methods described in U. S. Patent No. 2,530,348 and the J. Am. Chem. Soc., 67, 2218 (1945). Specifically, $\alpha$-chloro-γ-butyrolactone and α-bromo-γ-butyrolactone are particularly suitable for this purpose.

Representative of the ammonium, alkali metal and alkaline earth metal hydrocarbon mercaptides which may be used as starting materials are the ammonium, sodium, potassium, lithium, calcium and magnesium salts of methylmercaptan, ethylmercaptan, butylmercaptan, phenylmercaptan and benzylmercaptan.

In the second step of this process the α-hydrocarbon substituted mercapto-γ-butyrolactones are reacted with approximately one equivalent of a suitable ammonium, alkali metal or alkaline earth metal alkyl mercaptide to produce the corresponding ammonium, alkali metal or alkaline earth metal alkyl mercaptide addition product of the α-hydrocarbon substituted mercapto-γ-butyrolactone. This reaction is conveniently conducted in the presence of an inert non-hydroxylic solvent such as hexane, benzene, chloroform and the like. The addition product forms readily at ordinary temperatures and may be recovered from the reaction mixture by removing the solvent.

Examples of additional products which may be produced in this manner are the sodium methylmercaptide addition product of α-methylmercapto-γ-butyrolactone, the potassium ethylmercaptide addition product of α-methylmercapto-γ-butyrolactone, the sodium methylmercaptide addition product of α-benzylmercapto-γ-butyrolactone and the like.

Ammonium, alkali metal and alkaline earth metal alkyl mercaptide addition products of α-alkyl-mercapto-γ-butyrolactones may also be prepared according to a one step process, rather than according to the two step method previously described, by reacting directly about two equivalents of a suitable ammonium, alkali metal or alkaline earth metal alkyl mercaptide with one equivalent of an α-halo-γ-butyrolactone.

According to this reaction the products produced have identical mercapto substituents, i. e., R=R', and are therefore useful intermediates in preparing α,γ-bis[alkylmercapto] butyric acids. The production of these addition products may be conveniently achieved according to the reaction conditions described above for the production of such compounds in two steps.

The ammonium, alkali metal and alkaline earth metal alkyl mercaptide addition products of α-hydrocarbon substituted mercapto-γ-butyrolactones are converted to the corresponding α-hydrocarbon substituted mercapto-γ-alkyl mercapto butyric acids according to the next step of this process by heating the addition product at an elevated temperature. For this purpose, temperatures of about 150–200° C. are satisfactory although it is preferred to effect the reaction at about 170° C. At such temperatures the reaction goes to completion in about one hour. The product forms as an alkali metal or alkaline earth metal salt which may be conveniently recovered or hydrolyzed to the free acid without prior isolation by acidifying the reaction mixture to about pH 3 with a suitable mineral acid. Recovery of the mercapto substituted butyric acid is achieved according to conventional methods such as adding water to the mixture and extracting the product with a water immiscible inert organic solvent. By the application of this procedure α,γ-bis[alkylmercapto] butyric acids, such as the specific examples previously disclosed herein, and α-hydrocarbon substituted mercapto-γ-alkylmercapto butyric acids such as α-methylmercapto-γ-ethylmercapto butyric acid, α-ethylmercapto-γ-methylmercapto butyric acid, α-phenylmercapto-γ-ethylmercapto butyric acid, α-propylmercapto-γ-ethylmercapto butyric acid and α-benzylmercapto-γ-methylmercapto butyric acid may be produced from the appropriate butyrolactone addition product. Salts and esters of these and similar compounds may be produced by the methods previously described herein. Furthermore, these compounds may be used in the production of 5-[3-(1,2-dithiacyclopentyl)] pentanoic acid by the procedure referred to prior hereto.

The following examples are included to illustrate specific embodiments of this invention.

EXAMPLE I

*Production of α,γ-bis[methylmercapto] butyric acid*

To a solution of 77 gm. of sodium methoxide in 750 ml. of cold anhydrous methanol is added 100 gm. of methylmercaptan. The mixture is stirred while cooling by means of an ice bath. To the resulting solution of sodium methylmercaptide is added 105 gm. of α,γ-dibromobutyric acid. The α,γ-dibromobutyric acid is added dropwise over a period of 15 minutes during which the temperature of the reaction mixture rises to about 30–40° C. The reaction mixture containing the sodium salt of α,γ-bis[methylmercapto] butyric acid is concentrated to a small volume by evaporation on a water bath under reduced pressure, 500 ml. of water is added and the pH is adjusted to 3 with hydrochloric acid. The α,γ-bis[methylmercapto] butyric acid separates and is extracted with chloroform. The chloroform solution is extracted with aqueous sodium bicarbonate, and the bicarbonate solution is acidified and extracted with chloroform. The chloroform solution is dried over magnesium sulfate and concentrated under reduced pressure to an oil. The α,γ-bis[methylmercapto] butyric acid so obtained has a refractive index: $n_D^{25}=1.5276$ and a neutralization equivalent of 183 (theory 180).

The α,γ-dibromobutyric acid is prepared as follows: 280 gm. of γ-butyrolactone and 10 ml. of phosphorous tribromide are combined and heated to 100° C. with stirring. Bromine is added to the mixture for about 2.5 hours. During the first 1.5 hours the temperature is maintained at about 125–130° C. The temperature is then lowered to 90° C. to prevent evolution of hydrogen bromide. After the bromine addition is complete the reaction mixture is heated at 90–95° C. for about 2 hours and then cooled. The solution contains α,γ-dibromobutyric acid.

*Production of methyl-α,γ-bis[methylmercapto] butyrate*

13.29 gm. of α,γ-bis[methylmercapto] butyric acid is cooled in an ice-bath and 9.7 gm. of thionyl chloride added thereto. The reaction mixture is allowed to stand overnight at ice-bath temperature and then the excess thionyl chloride is removed by distillation under diminished pressure. The residue, consisting essentially of α,γ-bis[methylmercapto] butyryl chloride is cooled in an ice-bath and 25 ml. of methanol is added. After the evolution of gas ceases the mixture is concentrated under reduced pressure at 40° C. The residue, consisting of impure methyl-α,γ-bis[methylmercapto] butyrate is dissolved in ether and washed with aqueous sodium bicarbonate. The ether extract is washed with water, dried over anhydrous magnesium sulfate, and concentrated under diminished pressure to an oil consisting of methyl-α,γ-bis[methylmercapto] butyrate.

EXAMPLE II

*Production of α,γ-bis[ethylmercapto] butyric acid*

About 15.5 gm. of ethylmercaptan is added with stirring to a cold mixture of 14 gm. of potassium hydroxide in 200 ml. of ethanol. To the cold ethanolic solution of potassium ethylmercaptide is added 21 gm. of α,γ-dibromobutyric acid with stirring over a period of 1 hour. The solvent is removed under diminished pressure leaving a residue consisting essentially of potassium-α,γ-bis[ethylmercapto] butyrate. The residue is added to water, acidified to pH 3 and extracted with chloroform. By evaporating the chloroform solution under diminished pressure there is obtained α,γ-bis[ethylmercapto] butyric acid.

EXAMPLE III

*Production of α,γ-bis[butylmercapto] butyric acid*

A solution of sodium butylmercaptide is prepared by dissolving 27 gm. of sodium methoxide in 300 ml. of cold methanol and adding 45 gm. of butylmercaptan with cooling and stirring. To the cooled solution is added 39 gm. of α,γ-dibromobutyric acid and the mixture allowed to stand for several hours. After removing the solvent under diminished pressure 100 ml. of water is added to the residue of sodium-α,γ-bis[butylmercapto] butyrate. Concentrated hydrochloric acid is added to pH 3 and unreacted butylmercaptan removed by steam distillation. The residue containing α,γ-bis[butylmercapto] butyric acid is added to chloroform and extracted with aqueous sodium bicarbonate. The purified product is isolated by acidification of the aqueous solution, extraction with chloroform and removal of the solvent.

*Production of ethyl-α,γ-bis[butylmercapto] butyrate*

About 0.1 mole of α,γ-bis[butylmercapto] butyric acid is added slowly to 0.15 mole of thionyl chloride. After the reaction has terminated excess thionyl chloride is removed under diminished pressure leaving α,γ-bis[butylmercapto] butyryl chloride. The acid chloride is cooled, combined with an excess of ethanol and warmed to 50–70° C. The ethyl ester of α,γ-bis[butylmercapto] butyric acid is isolated from the reaction mixture by removing excess ethanol.

EXAMPLE IV

*Production of α,γ-bis[phenylmercapto] butyric acid*

To 250 ml. of cold methanol is added 0.4 mole of sodium methylate and 0.4 mole of phenylmercaptan with stirring and cooling. About 0.13 mole of α,γ-dibromobutyric acid is added to the cold solution of sodium phenylmercaptide and the mixture concentrated under reduced pressure to obtain sodium-α,γ-bis[phenylmercapto] butyrate. The sodium salt is added to 100 ml. of water and the solution is steam distilled to remove excess phenylmercaptan and other impurities. The residue is added to water, acidified and the α,γ-bis[phenylmercapto] butyric acid extracted with chloroform and isolated by removing the solvent.

*Production of methyl-α,γ-bis[phenylmercapto] butyrate*

0.2 mole of α,γ-bis[phenylmercapto] butyric acid and 0.3 mole of thionyl chloride are reacted under anhydrous conditions at a slightly elevated temperature. Upon terimnation of the reaction the mixture is distilled at room temperature under diminished pressure to remove excess thionyl chloride leaving a residue consisting of α,γ-bis[phenylmercapto] butyryl chloride. The acid chloride is reacted with an excess of methanol to produce the methyl ester of α,γ-bis[phenylmercapto] butyric acid. The product is isolated and purified by conventional methods.

EXAMPLE V

*Production of α,γ-bis[benzlymercapto] butyric acid*

To a solution of 81 gm. of sodium methylate in 800 ml. of methanol is added 186 gm. of benzyl-mercaptan. About 123 gm. of α,γ-dibromobutyric acid is added dropwise to the mixture with cooling and stirring. The mixture is refluxed for about one hour, the methanol removed and the residue consisting of sodium-α,γ-bis[benzylmercapto] butyrate added to ice water. The aqueous solution is acidified by hydrochloric acid giving α,γ-bis[benzylmercapto] butyric acid as an oil. The product is purified by dissolving it in ether, extracting with aqueous potassium bicarbonate, acidifying the aqueous solution with acid and extracting the product with ether. The purified α,γ-bis[benzylmercapto] butyric acid is recovered by removing the ether under reduced pressure.

*Production of ethyl-α,γ-bis[benzylmercapto] butyrate*

Approximately 0.2 mole of thionyl chloride is added to 0.15 mole of cooled α,γ-bis[benzylmercapto] butyric acid with stirring. After the initial vigorous reaction the mixture is allowed to warm to room temperature, stand for 1 hour and the excess thionyl chloride removed by evaporation under diminished pressure. The product is treated with ethanol and concentrated under diminished pressure. The residue is primarily ethyl-α,γ-bis[benzylmercapto] butyrate. It is purified by dissolving the product in chloroform, washing the chloroform solution with aqueous sodium bicarbonate and subsequently removing the solvent.

EXAMPLE VI

*Production of α-methylmercapto-γ-butyrolactone*

A solution of 20.3 gm. of sodium methylmercaptide in 225 ml. of methanol is added to a cooled solution of 37.7 gm. of α-bromo-γ-butyrolactone in 50 ml. of methanol. After standing at room temperature for about one hour the methanol from the reaction mixture is distilled off under diminished pressure and replaced with 100 ml. of water. The impure α-methylmercapto-γ-butyrolacetone which separates out as an oil is extracted with chloroform. The resulting chloroform solution is washed with water and dried over magnesium sulfate. The chloroform is removed under diminished pressure leaving an oil which is distilled to give α-methylmercapto-γ-butyrolacetone boiling at 64.0–66.5° C./0.1 mm., $n_D^{25}=1.5040$. The infrared spectrum discloses a lacetone band at 5.86 μ and absorption in the 13–15 μ region which is indicative of the C—S—C bond.

*Production of the sodium methylmercaptide addition product of α-methylmercapto-γ-butyrolacetone*

A solution of 10.8 gm. of α-methylmercapto-γ-butyrolacetone in 20 ml. of toluene is added to a stirred suspension of 7 gm. of sodium methylmercaptide in 30 ml. of toluene. The mixture is stirred at room temperature for one hour and allowed to stand overnight. The toluene is then removed by distillation to give the sodium methylmercaptide addition product of α-methylmercapto-γ-butyrolacetone.

*Production of α,γ-bis[methylmercapto] butyric acid from the sodium methylmercaptide addition product of α-methylmercapto-γ-butyrolactone*

The sodium methylmercaptide addition product of α-methylmercapto-γ-butyrolacetone prepared above is heated at about 165–170° C. for thirty minutes. After cooling the fused mixture to about 100° C. it is dissolved in 120 ml. of water and the solution adjusted to pH 3 with hydrochloric acid. The α,γ-bis[methylmercapto] butyric acid separates from solution and is extracted with chloroform. The chloroform solution is extracted with aqueous sodium bicarbonate, the aqueous extract acidified with hydrochloric acid and extracted with chloroform. The chloroform extract is washed with water and dried over magnesium sulfate. The chloroform is removed by evaporation under diminished pressure leaving substantially pure α,γ-bis[methylmercapto] butyric acid as a heavy oil, B. P. 154–158° C./0.15 mm., $n_D^{25}$=1.5267, neutralization equivalent=184 (theory 180). The infrared spectrum in carbon disulfide indicates a carboxylic acid with a C=O starch at 5.85 μ.

*Production of methyl-α,γ-bis[methylmercapto] butyrate*

An excess of diazomethane in ether is added to a cold solution of 1.3 gm. of α,γ-bis[methylmercapto] butyric acid in 20 ml. of anhydrous ether. After standing at room temperature for 10 minutes the ether is removed under reduced pressure. The resulting oil is distilled under diminished pressure to give methyl-α,γ-bis[methylmercapto] butyrate, B. P. 72–74° C./0.13 mm., $n_D^{25}$=1.5097.

EXAMPLE VII

*Production of the potassium ethylmercaptide addition product of α-methylmercapto-γ-butyrolactone*

A solution of 0.1 mole of α-methylmercapto-γ-butyrolactone, prepared as in Example VI, in 30 ml. of toluene is added with stirring to a suspension of 0.12 mole of potassium ethylmercaptide in 50 ml. of toluene. The mixture is stirred for several hours at about 20–40° C. and the toluene removed under reduced pressure to obtain the potassium ethylmercaptide addition product of α-methylmercapto-γ-butyrolactone.

*Production of α-methylmercapto-γ-ethylmercapto butyric acid*

The potassium ethylmercaptide addition product of α-methylmercapto-γ-butyrolactone prepared above is heated at 150–180° C. for 45 minutes, cooled and dissolved in water. The aqueous solution of potassium-α-methylmercapto-γ-ethylmercapto butyrate is acidified to pH 3 with concentrated hydrochloric acid and extracted with chloroform. The chloroform solution is extracted with aqueous sodium bicarbonate, the aqueous extract is acidified and finally extracted with ether. The α-methylmercapto-γ-ethylmercapto butyric acid is isolated by removing the ether and is purified by distillation under diminished pressure.

EXAMPLE VIII

*Production of α-propylmercapto-γ-butyrolactone*

To a solution of 0.3 mole of potassium propylmercaptide in 250 ml. of ethanol is added 0.3 mole of α-bromo-γ-butyrolactone. The reaction proceeds quickly to give a mixture containing α-propylmercapto-γ-butyrolactone. The product is isolated by removing the solvent, pouring the residue into water, extracting with chloroform and evaporating off the chloroform. It is further purified by fractional distillation.

*Production of the sodium ethylmercaptide addition product of α-propylmercapto-γ-butyrolactone*

The α-propylmercapto-γ-butyrolactone produced according to the method described above is reacted with an equivalent amount of potassium ethylmercaptide in 70 ml. of toluene. The mixture is stirred overnight at room temperature and the sodium ethylmercaptide addition product of α-propylmercapto-γ-butyrolactone recovered by distilling off the solvent.

*Production of α-propylmercapto-γ-ethylmercapto butyric acid*

The sodium ethylmercaptide addition product of α-propylmercapto-γ-butyrolactone from above is fused at about 170° C. for about 30 minutes, cooled and heated to 250 ml. of water. The aqueous solution of sodium α-propylmercapto-γ-ethylmercapto butyrate is acidified and extracted with ether. By removing the ether there is obtained α-propylmercapto-γ-ethylmercapto butyric acid.

EXAMPLE IX

*Production of α-benzylmercapto-γ-butyrolactone*

About 54 gm. of sodium methylate is dissolved in 400 ml. of cold methanol and combined with a solution of 124 gm. of benzylmercaptan in 200 ml. of methanol. After standing for 15 minutes 164 gm. of α-bromo-γ-butyrolactone is added to the mixture with cooling. The mixture is allowed to stand at room temperature for about one hour, filtered and the solvents removed under reduced pressure. The residue is added to 300 ml. of water, extracted with chloroform and the chloroform removed. The residue is distilled to give α-benzylmercapto-γ-butyrolactone, B. P. 137–140° C./0.03 mm., $n_D^{25}$=1.5752.

*Production of the sodium methylmercaptide addition product of α-benzylmercapto-γ-butyrolactone*

To a stirred solution of 0.4 mole of α-benzylmercapto-γ-butyrolactone in 40 ml. of toluene is added a suspension of 0.5 mole of sodium methylmercaptide in 150 ml. of benzene. The mixture is maintained at 20–40° C. for one hour and the benzene removed under reduced pressure to give the sodium methylmercaptide addition product of α-benzylmercapto-γ-butyrolactone.

*Production of α-benzlymercapto-γ-methylmercapto butyric acid*

Approximately 0.1 mole of the sodium methylmercaptide addition product of α-benzylmercapto-γ-butyrolactone is heated to 170–180° C. for two hours, cooled and added to water. The aqueous solution of sodium α-benzylmercapto-γ-methylmercapto butyrate is acidified, extracted with ether and the ether removed to give α-benzylmercapto-γ-methylmercapto butyric acid.

EXAMPLE X

*Production of α,γ-bis(allylmercapto) butyric acid*

About 1.5 moles of allyl bromide is added dropwise to a stirred refluxing solution of 1.5 moles of thiourea in 500 ml. of methanol over a period of fifteen minutes, and refluxing is then continued for an additional thirty minutes. A solution of three moles of potassium hydroxide in methanol is next added rapidly and the solution refluxed for another twenty minutes.

The solution of potassium allylmercaptide thus prepared is cooled and 0.5 mole of α,γ-dibromobutyric acid is added. The mixture is allowed to stand at room temperature overnight, and then concentrated under reduced pressure. The residue is diluted with water and acidified concentrated HCl. The desired product is isolated from the acidic solution by extraction with chloroform and subsequent removal of the solvent under reduced pressure. The product had the following physical constants: Neut. equiv. 247 (calc. 232.); mol. wt. (ebulliometric) 241±4 (calc. 232); sulfur 25.68% (calc. 27.60%).

*Production of α,γ-bis(allylmercapto) butyryl chloride*

A benzene solution containing 13 g. of α,γ-bis(allylmercapto) butyric acid is cooled in an ice bath and 5 ml. of thionyl chloride added. The mixture is stirred with cooling for one hour, the excess thionyl chloride removed under reduced pressure and α,γ-bis(allylmercapto) butyryl chloride purified by distillation: B. P. 130–137° C./1–2 mm.; $n_D^{25}$=1.5456.

*Production of methyl-α,γ-bis(allylmercapto) butyrate*

Twenty ml. of cold methanol is added to 4.0 g. of α,γ-bis(allylmercapto) butyryl chloride and the mixture allowed to stand. The excess alcohol is removed under reduced pressure and the residue distilled to give methyl-α-γ-bis(allylmercapto) butyrate: B. P. 80–82° C./.05 mm.; $n_D^{25}=1.5280$.

What is claimed is:

1. A compound having the formula

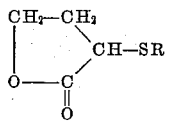

wherein R is selected from the group consisting of lower alkyl, lower alkenyl, phenyl and benzyl radicals.

2. α-lower-alkylmercapto-γ-butyrolactone.
3. α-Methylmercapto-γ-butyrolactone.
4. α-Propylmercapto-γ-butyrolactone.
5. α-Phenylmercapto-γ-butyrolactone.
6. α-Benzylmercapto-γ-butyrolactone.
7. The process for the production of a compound having the formula

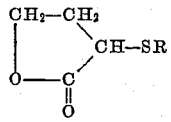

which comprises treating approximately one equivalent of an α-halo-γ-butyrolactone with approximately one equivalent of a compound having the formula YSR, in each occurrence R being selected from the group consisting of lower alkyl, lower alkenyl, phenyl and benzyl radicals and Y a member of the group consisting of ammonium, alkali metals and alkaline earth metals.

8. The process for the production of an α-loweralkyl-mercapto-γ-butyrolactone which comprises treating approximately one equivalent of an α-halo-γ-butyrolactone with approximately one equivalent of a member of the group consisting of ammonium, alkali metal and alkaline earth metal lower alkylmercaptides.

9. The process for the production of α-methylmercapto-γ-butyrolactone which comprises treating α-bromo-γ-butyrolactone with sodium methylmercaptide.

References Cited in the file of this patent

Birkofer: Berichte, 87, 1189–96 (1954); (C. A. 49:13091g).